United States Patent [19]

Faulstich et al.

[11] 4,213,787

[45] Jul. 22, 1980

[54] HIGH REFRACTIVE INDEX GLASSES OF LIMITED SPECIFIC GRAVITY FOR DISTANCE AND NEAR VISION SPECTACLE LENSES

[75] Inventors: Marga Faulstich, Mainz; Volkmar Geiler, Mainz-Mombach; Georg Gliemeroth, Mainz-Finthen, all of Fed. Rep. of Germany

[73] Assignee: JENAer Glaswerk Schott & Gen., Mainz, Fed. Rep. of Germany

[21] Appl. No.: 45,613

[22] Filed: Jun. 5, 1979

[30] Foreign Application Priority Data

Jun. 7, 1978 [DE] Fed. Rep. of Germany ....... 2824982

[51] Int. Cl.$^2$ .......................... C03C 3/04; C03C 3/08; C03C 3/10
[52] U.S. Cl. .................... 106/47 Q; 106/52; 106/53; 106/54
[58] Field of Search .................... 106/47 Q, 54, 53, 52

[56] References Cited

U.S. PATENT DOCUMENTS

| | | | |
|---|---|---|---|
| 4,084,978 | 4/1978 | Sagara | 106/47 Q |
| 4,128,432 | 12/1978 | Komorita et al. | 106/54 X |

FOREIGN PATENT DOCUMENTS 1260712  2/1968  Fed. Rep. of Germany .

Primary Examiner—Helen M. McCarthy
Attorney, Agent, or Firm—Haight & Huard

[57] ABSTRACT

Optical glasses having high refractive indexes and low specific gravities are provided for use as both distant and near vision spectacle lenses. The glasses consist essentially of low molecular weight cationic oxides, alkali metal oxides and divalent oxides to promote the crystallization stability of the glass. They have good chemical resistance, chemical hardenability and a thermal expansion coefficient between 93 and $99 \times 10^{-7}/°$C. in the range of 20°–300° C. Optical lenses can be continuously produced due to the high crystallization stability of the glasses and the resultant spectacle lenses have high dioptric values even with thinner edge or center thicknesses.

2 Claims, No Drawings

HIGH REFRACTIVE INDEX GLASSES OF LIMITED SPECIFIC GRAVITY FOR DISTANCE AND NEAR VISION SPECTACLE LENSES

BACKGROUND OF THE INVENTION

This invention relates to high refractive index optical glasses having a low specific gravity for utilization as both distant vision and near vision spectacle lenses having refractive indexes nd=1.79–1.81, dispersions vd=31–29 and specific gravities s=3.4–3.7.

The first lightweight high refractive index glasses utilized as spectacle lenses became known in 1973. These glasses had a refractive index nd=1.70, a dispersion vd=30 and a specific gravity s=3.0.

The object of the present invention is to produce high refractive index glasses which allow an optician to produce spectacle lenses of high dioptric values having thinner edge thicknesses (negative lenses) and/or smaller center thicknesses (positive lenses) than those previously used. The shallow curvature of such lenses increases the optically effective field of vision and improves the cosmetic effects of the spectacle in which they are used. The specific gravity for high refractive index glasses must be maintained as low as possible if the glasses are to benefit the spectacle-wearer, e.g., where a spectacle glass has a refractive index nd=1.79 and a specific gravity of approximately 3.3 then a 46 mm diameter lens will be no heavier than a lens made of a glass having a lower refractive index nd=1.70, a dispersion vd=30 and a specific gravity s=3.0. Where the glass has a refractive index nd=1.79 and a specific gravity of 3.7, then the weight of a 46 mm diameter lens increases by approximately 10–14 percent (approximately 2–3 g) according to the dioptric value thereof.

Accordingly, the object of the invention is more particularly to produce optical glasses having the following properties:
 (a) nd=1.79–1.81
 (b) vd=31–29
 (c) s=3.4–3.7

The optical glasses must also fulfill the following important conditions in order to be suitable for use as spectacle lenses:
 (a) they must have high crystallization stability to allow continuous production processes;
 (b) they must have good chemical resistance;
 (c) they must have chemical hardenability to withstand the falling ball tests of ASTM and DIN 4646; and
 (d) in order to use the glass not only for distant vision spectacle lenses but also for near vision spectacle lenses they must be capable of fusing with conventional, distant vision commercial crown glasses (nd=1.523) and light, higher refractive index glasses (nd=1.70) so that the expansion coefficient must consequently lie between 93 and 99×10$^{-7}$/°C. in the range of 20°–300° C. and the viscosity related to temperature must be adjusted within the melting range to the viscosity of normal commercial distant vision glasses.

Known optical glasses having an nd=1.79–1.81 do not fulfill the aforementioned requirements, as illustrated by the following examples:

| Type | nd | vd | s | α × 10$^7$/°C. (20°–300° C.) |
|---|---|---|---|---|
| Heavy Flint Glasses | | | | |
| SF 6 | 1.8051 | 25.43 | 5.18 | 90 |
| SF 11 | 1.7847 | 25.76 | 4.74 | 69 |
| LaF and LaSF Glasses | | | | |
| LaF 9 | 1.795 | 28.38 | 4.96 | 81 |
| LaSF 8 | 1.80741 | 31.61 | 4.87 | 70 |
| LaSF N 3 | 1.8080 | 40.75 | 4.68 | 72 |
| LaSF 11 | 1.80166 | 44.26 | 4.62 | 70 |
| LaSF 30 | 1.80200 | 46.47 | 4.90 | 71 |

Other optical glasses are disclosed by German Pat. No. 1,260,712 having refractive indexes nd=1.78–1.81 with specific gravities ≦4.0 which, as a result of their strong tendency to crystallize, are not suitable for continuous mass production purposes (e.g., glasses for spectacle lenses and large volume crucible melting). The crystallization tendency is determined by the magnitude of the crystallization growth speed and the crystallization temperature range in relation to the viscosity.

Such known glasses having a refractive index nd>1.75 contain 14–46 percent by weight of alkaline earth metals. Their ZnO content is 10–20 percent by weight, their TiO$_2$ content is 10–25 percent by weight and their SiO$_2$ content is 12–20 percent by weight. The alkali metal oxide content for glasses of nd>1.79 must not exceed 3 percent by weight and such glasses are not chemically hardenable.

The cooling of these glass melts, according to the above noted German patent description, must be undertaken "very rapidly, in order to avoid the yellow-brown coloration". The melts must be cast with a viscosity of <100 poises since the strong tendency to crystallize renders continuous and automatic production impossible. The high ZnO content of 10–20 percent by weight in conjunction with a 10–25 percent content by weight of TiO$_2$ is unfavorable in this respect.

OBJECTS OF THE INVENTION

Accordingly, it is a general object of the present invention to provide high refractive index optical glasses which have a low specific gravity and can be utilized as both distant and near vision spectacle lenses.

Another object of the present invention is to provide high refractive index optical glasses which have high crystallization stability in order to permit continuous production thereof, good chemical resistance, satisfactory chemical hardenability and the capability of being fused with conventional distant vision glasses and light, higher refractive index glasses.

An additional object of the present invention is to provide optical glasses which can be utilized to produce spectacle lenses having high dioptric values with thinner edge thickness or center thickness lenses than are conventionally used.

Upon study of the specification and appended claims, further objects, features and advantages of the present invention will become more fully apparent to those skilled in the art to which this invention pertains.

SUMMARY OF THE INVENTION

Briefly, the above and other objects, features and advantages of the present invention are attained in one aspect thereof by providing optical glasses for use as spectacle lenses which have a refractive index $nd = 1.79-1.81$, a dispersion $vd = 31-29$ and a specific gravity $s = 3.4-3.7$, the glasses consisting essentially of:

| Oxides | Weight Percent | |
|---|---|---|
| $SiO_2$ | 25–35 | |
| $TiO_2$ | 10–15 | ⎫ |
| | | ⎬ 28–35 |
| $Nb_2O_5$ | 18–24 | ⎭ |
| $ZrO_2$ | 3–9 | |
| SrO | 0–7 | ⎫ |
| | | ⎬ 12–20 |
| BaO | 7–20 | ⎭ |
| $B_2O_3$ | 0–7 | |
| $Li_2O$ | 5–8 | ⎫ |
| $Na_2O$ | 0–3 | ⎬ 5–9 |
| $K_2O$ | 0–2 | ⎭ |
| MgO | 0–2 | ⎫ |
| | | ⎬ 0–5 |
| CaO | 0–5 | ⎭ |
| ZnO | 0–4 | |
| PbO | 0–3 | |
| $Al_2O_3$ | 0–2 | |
| $La_2O_3$ | 0–5 | |
| $Ta_2O_5$ | 0–4 | |
| $Gd_2O_3$, $Y_2O_3$, $Bi_2O_3$, $WO_3$ | 0–3; and | |
| refining agent | 0.2–1, | | the optical glasses further having a high crystallization stability in order to permit continuous production of optical lenses.

DETAILED DESCRIPTION

The glasses formed in accordance with the present invention lie within the above-indicated composition range. Glasses of the following composition range are presently preferred:

| Oxides | Percent by Weight | |
|---|---|---|
| $SiO_2$ | 26–28 | |
| $TiO_2$ | 10–14 | ⎫ |
| | | ⎬ 30–33 |
| $Nb_2O_5$ | 18–23 | ⎭ |
| $ZrO_2$ | 3–6 | |
| SrO | 5–7 | ⎫ |
| | | ⎬ 16–18 |
| BaO | 9–12 | ⎭ |
| $B_2O_3$ | 3–5 | |
| $Li_2O$ | 6–8 | ⎫ |
| | | ⎬ 7–8 |
| $Na_2O$ | 1–2 | ⎭ |
| CaO | 0–3 | |
| ZnO | 0–2 | |
| PbO | 0–2 | |

| Oxides | Percent by Weight |
|---|---|
| $Al_2O_3$ | 0–1 |
| $La_2O_3$ | 0–4 |
| $Ta_2O_5$ | 0–2 |
| $As_2O_3$ | 0.1–1 |
| $Gd_2O_3$, $Y_2O_3$, $Bi_2O_3$ and $WO_3$ | 0–2 |

The glasses formed in accordance with the present invention thus consist extensively of the following: low molecular weight cationic oxides such as $SiO_2 + B_2O_3$; alkali metal oxides—preferably $Li_2O + Na_2O$ for ion exchange in the hardening process; $ZrO_2 + TiO_2 + Nb_2O_5$ to adjust the optical position; and divalent oxides in small quantities such as ZnO, PbO, MgO, CaO for crystallization stability and adaption of the thermal expansion coefficient.

The heavier oxides such as SrO and BaO (12–20 percent by weight) are particularly important to crystallization stability in glasses having a $TiO_2$ content of 10–15 percent and an $Nb_2O_5$ content of 18–24 percent by weight.

$La_2O_3$, $Y_2O_3$, $Bi_2O_3$, $Gd_2O_3$ and $WO_3$ contribute slightly to the reduction of crystallization when present in quantites of <3 percent by weight, but they tend to increase the specific gravity and are preferably avoided or used only in small amounts for economic reasons. The use of $GeO_2$ and $P_2O_5$ instead of $SiO_2$ in small amounts of <3 percent by weight is permissible once a marked stabilization of crystallization has been achieved. Refining of the melts is achieved with known refining agents such as $As_2O_3$ and/or $Sb_2O_3$ and/or M-fluorides of <1 percent by weight.

Without further elaboration, it is believed that one skilled in the art can, using the preceding description, utilize the present invention to its fullest extent. The following examples, therefore, are to be construed as merely illustrative and not limitative of the remainder of the disclosure in any way whatsoever. Unless otherwise indicated, all pressures and temperatures are ambient and all parts and percentages are by weight.

In the appended tables, specific examples of glasses formed in accordance with the composition claimed in the invention are listed: Table 1a shows the composition of 10 typical glasses in percent by weight; Table 1b shows the properties of glasses listed in Table 1a; and Table 2 lists the same glasses as Table 1a but expressed in mol percent.

TABLE 1a

| | Composition in Weight Percent | | | | | | | | | |
|---|---|---|---|---|---|---|---|---|---|---|
| Example Oxide | 1 | 2 | 3 | 4 | 5 | 6 | 7 | 8 | 9 | 10 |
| $SiO_2$ | 28.40 | 25.80 | 27.60 | 27.71 | 28.49 | 28.80 | 28.84 | 27.60 | 27.68 | 27.60 |
| $B_2O_3$ | 3.20 | 5.76 | 4.10 | 4.12 | 3.91 | 3.12 | 4.13 | 4.10 | 4.11 | 4.10 |
| $Li_2O_3$ | 6.35 | 6.57 | 6.20 | 7.23 | 6.37 | 7.25 | 6.25 | 6.20 | 6.22 | 6.20 |
| $Na_2O$ | 1.10 | 1.43 | 1.10 | 1.10 | 1.10 | 1.11 | 1.11 | 1.10 | 1.60 | 1.10 |
| MgO | — | 0.65 | — | — | — | — | — | — | — | — |
| ZnO | — | — | 2.00 | — | — | — | — | — | — | — |
| CaO | — | 1.63 | 2.00 | — | — | — | 2.92 | 2.90 | 3.41 | 2.90 |
| SrO | 6.50 | 5.81 | 6.30 | 6.33 | 6.52 | 6.34 | 6.35 | 6.30 | 6.32 | 6.30 |
| BaO | 10.80 | 9.71 | 10.50 | 10.54 | 10.83 | 10.57 | 10.58 | 10.50 | 10.53 | 10.50 |
| $Gd_2O_3$ | — | 1.20 | — | — | — | — | — | — | — | — |
| $La_2O_3$ | 3.2 | 3.83 | 2.10 | 2.11 | 3.21 | 1.11 | 2.12 | — | 2.11 | 2.10 |
| $Y_2O_3$ | — | — | — | — | — | — | 2.10 | — | — | — |
| $ZrO_2$ | 6.25 | 4.54 | 3.90 | 7.13 | 6.27 | 8.16 | 5.14 | 5.10 | 5.12 | 5.10 |
| $TiO_2$ | 12.30 | 11.94 | 11.00 | 11.04 | 13.34 | 11.08 | 14.11 | 11.00 | 14.04 | 11.00 |
| $Nb_2O_5$ | 21.70 | 20.93 | 22.90 | 22.49 | 19.76 | 22.16 | 18.25 | 22.90 | 18.66 | 22.90 |

TABLE 1a-continued

Composition in Weight Percent

| Example Oxide | 1 | 2 | 3 | 4 | 5 | 6 | 7 | 8 | 9 | 10 |
|---|---|---|---|---|---|---|---|---|---|---|
| $As_2O_3$ | 0.20 | 0.20 | 0.20 | 0.20 | 0.20 | 0.20 | 0.20 | 0.20 | 0.20 | 0.20 |

Table 1b

Properties of the Glasses in Table 1A

| Example | 1 | 2 | 3 | 4 | 5 |
|---|---|---|---|---|---|
| nd | 1.8010 | 1.80008 | 1.80159 | 1.80021 | 1.81017 |
| vd | 30.0 | 30.5 | 30.2 | 30.1 | 29.42 |
| s | 3.547 | 3.526 | 3.547 | 3.519 | 3.546 |
| $\alpha \times 10^7/°C$ 20–300° C. | 92 | 98.3 | 94.7 | 96 | 95.5 |
| Tg °C. | 561 | 524 | 539 | 544 | 549 |
| EW °C. | 679 | | 652 | 655 | 669 |
| Cryst. DTA-Test Rising Temp. | | | | | |
| KGmax °C. | 910 | 882 | 871 | 890 | 880 |
| Poises | 500 | 300 | 500 | 440 | 390 |
| Chem. hardening | | | | | |
| 15h at °C. | 520 | 480 | | 500 | |
| tempering μ/cm | 5670 | 5960 | | 2640 | |
| layer thickness in μ | 45–50 | 45 | | 40–45 | |
| melting stress in μ/cm | | 581 compression | 102 compression | 93 compression | 96 tension |

| Example | 6 | 7 | 8 | 9 | 10 |
|---|---|---|---|---|---|
| nd | 1.8003 | 1.79860 | 1.80009 | 1.80166 | 1.8017 |
| vd | 30.1 | 30.1 | 30.5 | 30.0 | 30.5 |
| s | 3.509 | 3.482 | 3.521 | 3.497 | 3.530 |
| $\alpha \times 10^7/°C$ 20–300° C. | 96 | 95.5 | 94.6 | 98 | 94 |
| Tg °C. | 547 | 551 | 543 | 534 | 548 |
| EW °C. | 664 | | 661 | 656 | 661 |
| Cryst. DTA-Test Rising Temp. | | | | | |
| KGmax °C. | 895 weak | 890 | 911 | 869 | 891 |
| Poises | 280 | ca 500 | 118 | ca 360 | 430 |
| Chem. hardening | | | | | |
| 15h at °C. | 480 | 500 | | 500 | 480 |
| tempering μ/cm | 7420 | 4020 | | 5320 | 5980 |
| layer thickness in μ | 60 | 45 | | 45 | 35 |
| melting stress in μ/cm | 41 compression | 97 compression | 23 tension | 418 compression | 33 tension |

TABLE 2

Composition in Mol Percent

| Example Oxide | 1 | 2 | 3 | 4 | 5 | 6 | 7 | 8 | 9 | 10 |
|---|---|---|---|---|---|---|---|---|---|---|
| $SiO_2$ | 40.09 | 35.68 | 38.41 | 38.50 | 39.58 | 39.68 | 38.61 | 38.28 | 37.18 | 38.37 |
| $B_2O_3$ | 3.90 | 6.88 | 4.93 | 4.94 | 4.69 | 3.71 | 4.77 | 4.91 | 4.77 | 4.92 |
| $Li_2O_3$ | 18.02 | 18.27 | 17.35 | 20.20 | 17.60 | 20.09 | 16.83 | 17.29 | 16.80 | 17.33 |
| $Na_2O$ | 1.51 | 1.92 | 1.48 | 1.48 | 1.48 | 1.48 | 1.44 | 1.48 | 2.08 | 1.48 |
| MgO | — | 1.34 | — | — | — | — | — | — | — | — |
| ZnO | — | — | 2.06 | — | — | — | — | — | — | — |
| CaO | — | 2.42 | 2.98 | — | — | — | 4.19 | 4.31 | 4.91 | 4.32 |
| SrO | 5.32 | 4.66 | 5.08 | 5.10 | 5.25 | 5.07 | 4.93 | 5.08 | 4.92 | 5.08 |
| BaO | 5.97 | 5.26 | 5.73 | 5.74 | 5.90 | 5.71 | 5.55 | 5.71 | 5.54 | 5.72 |
| $La_2O_3$ | 0.83 | 0.98 | 0.54 | 0.54 | 0.82 | 0.28 | 0.52 | — | 0.52 | 0.54 |
| $Gd_2O_3$ | — | 0.49 | — | — | — | — | — | — | — | — |
| $Y_2O_3$ | — | — | — | — | — | — | — | 0.77 | — | — |
| $ZrO_2$ | 4.30 | 3.06 | 2.65 | 4.83 | 4.25 | 5.49 | 3.36 | 3.45 | 3.35 | 3.46 |
| $TiO_2$ | 13.06 | 12.42 | 11.51 | 11.53 | 13.94 | 11.48 | 14.20 | 11.47 | 14.18 | 11.50 |
| $Nb_2O_5$ | 6.92 | 6.54 | 7.20 | 7.06 | 6.21 | 6.93 | 5.52 | 7.18 | 5.67 | 7.20 |
| $As_2O_3$ | 0.08 | 0.08 | 0.08 | 0.08 | 0.08 | 0.08 | 0.08 | 0.08 | 0.08 | 0.08 |

Falling Ball Test

The falling ball test is standarized according to ASTM and DIN specifications as follows:

| | | | |
|---|---|---|---|
| - ASTM | 127 cm | 15.8 p | 1.75 cmkp |
| - DIN 4646 | 130 cm | 43.8 p | 5.80 cmkp |
| - additional test Russian standard" | different | 173.1 p | variable |

A standard support is used in all cases. In the event of glasses not breaking by all three balls, the fall height is increased to destruction with the "Russian standard." The fall loading in cmkp is taken as a measure of the impact-resistance for assessment purposes.

Table 1, Example 10

Melting Example

| Oxides | Percent by Weight | Starting Materials | Kg amounts weighed in for a 120 kg computed quantity of glass |
|---|---|---|---|
| $SiO_2$ | 27.6 | $SiO_2$ | 33.17 |
| $B_2O_3$ | 4.1 | $H_3BO_3$ | 8.71 |
| $Li_2O$ | 6.2 | $Li_2CO_3$ | 1.85 |
| $Na_2O$ | 1.1 | $Na_2CO_3$ | 2.26 |
| CaO | 2.9 | $CaCO_3$ | 5.30 |
| SrO | 6.3 | $Sr(NO_3)_2$ | 15.59 |
| BaO | 10.52 | $BaCO_3$ | 16.05 |
| $La_2O_3$ | 2.1 | $La_2O_3$ | 2.53 |
| $ZrO_2$ | 5.1 | $ZrO_2$ | 6.14 |
| $TiO_2$ | 16.0 | $TiO_2$ | 13.23 |
| $Nb_2O_5$ | 22.9 | $Nb_2O_5$ | 27.50 |

The batch is carefully mixed and placed in a platinum crucible or ceramic bath at 1260° C. Refining is carried out at approximately 1300°–1320° C. At approximately 970° C. ($\geq 500$ poises), the batch is drained and immediately pressed by automatic means into spectacle lens blanks.

The glass has the following physical-chemical properties:

| | |
|---|---|
| nd | 1.8017 |
| vd | 30.5 |
| s | 3.53 |
| $\alpha \times 10^7/°C.$ (20°–300° C.) | 94 |
| $\alpha \times 10^7/°C.$ (−30° to +70° C.) | 80 |
| Tg °C. | 548 |
| EW °C. | 661 |

| Chemical Resistance | |
|---|---|
| Acid resistance, class f | $\leq 2$ |
| Climatic change, resistance | 2 |
| Discoloration tendency | 0 |

Table 1, Example 8

Melting Example 2

| Oxides | Percent by Weight | Starting Materials | Kg amounts weighed in for a 120 kg computed quantity of glass |
|---|---|---|---|
| $SiO_2$ | 27.6 | $SiO_2$ | 33.17 |
| $B_2O_3$ | 4.1 | $H_3BO_3$ | 8.71 |
| $Li_2O$ | 6.2 | $Li_2CO_3$ | 18.48 |
| $Na_2O$ | 1.1 | $Na_2CO_3$ | 2.26 |
| CaO | 2.9 | $CaCO_3$ | 6.30 |
| SrO | 6.3 | $Sr(NO_3)_2$ | 15.597 |
| BaO | 10.5 | $BaCO_3$ | 16.05 |
| $La_2O_3$ | 2.1 | $La_2O_3$ | 2.53 |
| $ZrO_2$ | 5.1 | $ZrO_2$ | 6.14 |
| $TiO_2$ | 11.0 | $TiO_2$ | 13.23 |
| $Nb_2O_5$ | 22.9 | $Nb_2O_5$ | 27.50 |
| $As_2O_3$ | 0.2 | $As_2O_3$ | 0.24 |

After weighing in, the starting materials are mixed in a commercial mechanical mixer. The mixture is melted down at about 1200° C. in a melting trough, is refined at about 1280° C. and then stirred until it reaches about 1200° C. At about 1160° C. the molten mass is drained through a platinum pipe and is processed into bars; at lower drainage temperatures (and proportionally higher viscosity) it is possible to manufacture blobs and automatically processed die-formed parts.

The preceding examples can be repeated with similar success by substituting the generically or specifically described reactants or operating conditions of this invention for those used in the preceding examples.

From the foregoing description, one skilled in the art to which this invention pertains can easily ascertain the essential characteristics thereof and, without departing from the spirit and scope of the present invention, can make various changes and modifications to adapt it to various usages and conditions.

What is claimed is:

1. Optical glasses suitable for use as spectacle lenses having a refractive index nd=1.79–1.81, a dispersion vd=31–29 and a specific gravity s=3.4–3.7, consisting essentially of the following composition:

| Oxides | Weight Percent | |
|---|---|---|
| $SiO_2$ | 25–35 | |
| $TiO_2$ | 10–15 | } 28–35 |
| $Nb_2O_5$ | 18–24 | |
| $ZrO_2$ | 3–9 | |
| SrO | 0–7 | |
| | | } 12–20 |
| BaO | 7–20 | |
| $B_2O_3$ | 0–7 | |
| $Li_2O$ | 5–8 | |
| $Na_2O$ | 0–3 | } 5–9 |
| $K_2O$ | 0–2 | |
| MgO | 0–2 | |
| | | } 0–5 |
| CaO | 0–5 | |
| ZnO | 0–4 | |
| PbO | 0–3 | |
| $Al_2O_3$ | 0–2 | |
| $La_2O_3$ | 0–5 | |
| $Ta_2O_5$ | 0–4 | |
| $Gd_2O_3$, $Y_2O_3$, $Bi_2O_3$, $WO_3$ | 0–3; and | |
| refining agent | 0.2–1, | | said glasses having high crystallization stability as determined by the magnitude of crystal growth speed and the crystallization temperature range in relation to the viscosity in order to permit continuous production of said lenses.

2. Optical glasses according to claim 1, consisting essentially of the following composition:

| Oxides | Percent by Weight | |
|---|---|---|
| $SiO_2$ | 26–28 | |
| $TiO_2$ | 10–14 | } 30–33 |
| $Nb_2O_5$ | 18–23 | |
| $ZrO_2$ | 3–6 | |
| SrO | 5–7 | |
| | | } 16–18 |
| BaO | 9–12 | |
| $B_2O_3$ | 3–5 | |
| $Li_2O$ | 6–8 | |
| | | } 7–8 |
| $Na_2O$ | 1–2 | |
| CaO | 0–3 | |
| ZnO | 0–2 | |
| PbO | 0–2 | |
| $Al_2O_3$ | 0–1 | |
| $La_2O_3$ | 0–4 | |
| $Ta_2O_5$ | 0–2 | |
| $As_2O_3$ | 0.1–1 | |
| $Gd_2O_3$, $Y_2O_3$, $Bi_2O_3$ and $WO_3$ | 0–2 | |

* * * * *

UNITED STATES PATENT AND TRADEMARK OFFICE
CERTIFICATE OF CORRECTION

PATENT NO. : 4,213,787
DATED : July 22, 1980
INVENTOR(S) : Faulstich, et al.

It is certified that error appears in the above-identified patent and that said Letters Patent are hereby corrected as shown below:

Column 8, line 29: "$Li_{20}$" should read --- $Li_2O$ ---.

Signed and Sealed this

Twenty-fifth Day of November 1980

[SEAL]

Attest:

SIDNEY A. DIAMOND

Attesting Officer

Commissioner of Patents and Trademarks